United States Patent Office
3,669,693
Patented June 13, 1972

3,669,693
GERMANIA-SILICA GLASSES AND METHOD OF COATING

Robert H. Dalton, Corning, and Eugene F. Riebling, Horseheads, N.Y., assignors to Corning Glass Works, Corning, N.Y.

No Drawing. Original application June 24, 1968, Ser. No. 739,211, now Patent No. 3,542,572. Divided and this application Mar. 19, 1970, Ser. No. 24,972
Int. Cl. C23f *7/02;* H01l *3/00*
U.S. Cl. 117—201 8 Claims

ABSTRACT OF THE DISCLOSURE

This invention relates to glass compositions consisting essentially of $GeO_2$ and $SiO_2$ which are especially suitable as protective insulating surface layers on silicon semiconductor devices.

This application is a divisional application based upon Ser. No. 739,211, filed June 24, 1968 and now Pat. No. 3,542,572.

The need for a protective insulating surface layer on the silicon bodies employed in semiconductor devices has long been recognized and the customary commercial practice has involved forming such a layer through heating the silicon body in an oxygen-containing atmosphere to an elevated temperature so that the surface layer thereof is oxidized to silica. The fundamental mechanical requirements for a protective insulating surface are two: first, the seal therebetween must be absolutely impervious; and, second, it must possess adequate strength for the application intended. It is apparent, then, that to meet these requirements the layer must be devoid of any tension stresses which could lead to cracks or checks. Hence, there should be a reasonable match between the thermal expansion of the protective surface layer and that of the body portion of the article from the setting point of the glass (a few degrees above its strain point) down to room temperature. In other words, the contraction of the glass should be reasonably close to that of the silicon from around 600° C. or 700° C. (the setting point of the glasses we are considering) down to say 25° C.

However, the silica layer developed through the oxidation of the silicon body, as in current practice, differs substantially in its expansion characteristics from that of the parent silicon (average expansion 25°–700° C. around $5\times10^{-7}/°$ C. compared to around $40\times10^{-7}/°$ C.). This consequently imposes a severe limitation on the thickness of the layer that can be formed thereon intact and, thus, on the degree of protection and insulation that can be secured.

While there are several commercially available glasses which would be satisfactory for this service from the thermal expansion point of view, such glasses contain elements exhibiting a deleterious effect upon the electronic operation of the semiconductor device.

Therefore, the principal object of this invention is to provide a glass having a coefficient of thermal expansion approximating $40\times10^{-7}/°$ C. (25°–700° C.) and being free from elements which interfere with the electronic properties of silicon.

Another object of this invention is to provide a protective insulating surface layer on silicon semiconductor devices which does not have any deleterious electronic effect upon the operation of the device.

Still another object is to provide a method for securely bonding a glass having a coefficient of thermal expansion approximating $40\times10^{-7}/°$ C. (25°–700° C.) and being free from elements which intefere with the electronic properties of silicon to a body of silicon.

We have discovered that these objects can be achieved by utilizing glass compositions within a limited range of the $GeO_2$-$SiO_2$ field wherein constituents other than $GeO_2$ and $SiO_2$ may be tolerated in very small amounts only and are, preferably, totally absent. Thus, we have learned that a glass possessing the suitable coefficient of thermal expansion for bonding securely to a silicon body and being devoid of elements deleteriously affecting the electronic properties of silicon can be produced from a batch, calculated in mole percent on the oxide basis, of about 40–55% $GeO_2$, and 45–60% $SiO_2$, the sum of these two components constituting at least 98 mole percent of the batch.

The following table records two examples of glass compositions suitable in the operation of this invention calculated from their respective batches on the oxide basis in mole percent, exclusive of minor impurities which may be present in the batch materials. The batch ingredients may comprise any materials, either oxides or other compounds, which, on being melted together are converted to the desired oxide compositions in the proper proportions.

The batches were compounded, the ingredients ballmilled together to aid in obtaining a homogeneous melt, and then melted in open platinum crucibles under nonreducing conditions, utilizing an atmosphere of low water content, at temperatures ranging between about 1600°–1700° C. for about 4–16 hours. The crucibles containing the melts were removed from the melting chamber and transferred to an annealer operating at about 725°–750° C. Bars about ¼" x ¼" x 4" were cut from the annealed shapes of glass for the measurement of physical properties.

The table also reports the softening point (estimated), annealing point, strain point, and average coefficient of thermal expansion between 25° and 300° C. and between 25° and 700° C. ($\times10^{-7}/°$ C.) of each example. These measurements were obtained utilizing test methods conventional in the glass art.

TABLE I

| | 1 | 2 |
|---|---|---|
| $SiO_2$ (mole percent) | 49.4 | 57.8 |
| $GeO_2$ (mole percent) | 50.6 | 42.2 |
| Softening point, ° C. (est.) | 1,300–1,400 | 1,300–1,400 |
| Annealing point, ° C | 737 | 719 |
| Strain point, ° C | 642 | 626 |
| Expansion: | | |
| 25°–300° C | 51.0 | 43.7 |
| 25°–700° C | 44.4 | 39.3 |

We have found that such glasses can be securely bonded to single crystal silicon wafers through the use of glazing techniques. Electron microscopy has revealed a narrow glass-to-silicon interface (1/1/1 plane) that is very homogeneous and bubble-free where the glazing is undertaken in an inert atmosphere at temperatures ranging between about 1300°–1400° C.

In carrying out the glazing procedure, a frit-type slurry of the glass is first produced. Hence, the glass is ground to a powder, preferably all passing a 200 mesh Tyler screen (74 microns). The powdered glass is then mixed with a readily-volatile liquid vehicle, normally an organic carrier such as amyl acetate, ethyl acetate, methyl ethyl ketone, etc. although, of course, water may be employed. In the preferred practice, the slurry consists of a well-mixed one-to-four volume ratio mixture of powdered glass and amyl acetate. In the above examples, the slurry was applied dropwise to circular silicon wafers about 10 mm. in diameter and 1 mm. thick, usually 2 to 3 drops per sample being sufficient to yield a coating of about 0.5 mm. thickness. The use of excess slurry impairs the fining processes (bubble removal) during the subsequent firing. The slurry-wafer composite is then ready for the glazing process which consists of firing the composite at about 1300° C. to 1400° C. for a sufficient length of time to softened and spread the frit over the silicon wafer.

Although the slurry-coated wafer can be fired directly to 1300°–1400° C., the glaze developed thereby may exhibit bubbles or even gaps which will adversely affect the strength of the bond formed between the glaze and the silicon substrate. Therefore, the glazing procedure preferably involves three steps.

In the first step, the slurry-wafer composite is dried, this drying being conducted at slightly elevated temperatures to remove the vehicle and commonly being undertaken in a vacuum, e.g., vacuum drying at 80° C. for 30 minutes. High drying temperatures can lead to bubbling and spattering of the slurry.

In the second step, the dried slurry-wafer composite is heated to about 750°–1000° C. and maintained thereat for a sufficient length of time to allow oxygen gas removal. (The silicon wafer will oxidize at temperatures above about 1000° C. in the presence of air.) An inert gas such as helium or argon may be passed into the heating chamber to aid in the removal of oxygen. Hence, for example, dry, oxygen-free argon may be flushed through the heating chamber for about 15 minutes at a rate of 1–10 cc./minute.

In the third step of the glazing process, the slurry-coated silicon wafer is heated to about 1300°–1400° C., preferably in the presence of a slight flow of an inert gas, and maintained thereat for about 15–60 minutes. Firing times of less than about 15 minutes result in the incomplete fining of the glaze while firing times longer than about 60 minutes lead to substantial mass transport of portions of the glaze material. At temperatures lower than about 1300° C. the frit does not soften sufficiently to flow over the silicon wafer, whereas temperatures higher than about 1400° C. hazard the melting of the silicon (melting point of about 1410° C.). Hence, the firing temperatures for these composites of glass and silicon wafer are dependent upon the softening point of the frit utilized and the melting point of the silicon body. Frits containing more than about 70 mole percent $SiO_2$ can possess softening points close to or higher than the melting point of silicon and, consequently, may not be as satisfactory for this application as a protective insulating layer on silicon bodies. In frits containing more than about 55 mole percent $GeO_2$, the coefficient of thermal expansion is greater than $55\times10^{-7}$/° C. (25°–300° C.) and the expansion mismatch between the glass and the silicon substrate sets up higher interior tensile stresses which limit the thickness of the layer that can be formed in tact.

Following the above-recited firing procedure, the glaze-coated silicon body is cooled to room temperature, normally by merely removing the body from the heating chamber into the ambient atmosphere. The resultant glazes are commonly transparent, bubble-free, and may be 0.1 0.2 mm. or more thick. Such thicknesses are on the order of 10–100 times that achieved in the comemrcial thin film techniques for $SiO_2$ alone. Electrical resistivity measurements of these glazes have demonstrated them to approach that of a typical insulator such as $Al_2O_3$. Hence, their electrical resistivity greatly exceeds that of a silicon body.

Another method for producing impervious surface layers of the type heretofore described comprises evaporating in vacuo a coating consisting essentially of germanium and silicon in the atomic ratio of 45–60 silicon to 40–55 germanium onto a silicon body and then heating the coated body in an oxygen-containing atmosphere to thereby oxidize the metal coating to $SiO_2$ and $GeO_2$. This procedure permits the coating process to be undertaken without exposing the silicon to temperatures beyond those customarily encountered in the production of a silica layer through the oxidation of a silicon body as currently practiced commercially, viz., about 750°–900° C.

As has been explained above, the achievement of glazes having coefficients of thermal expansion approximating $40\times10^{-7}$/° C. (25°–700° C.) (commonly between about 25–$50\times10^{-7}$/° C.) and being free from any element interfering with the electronic properties of silicon requires a composition consisting essentially of $GeO_2$ and $SiO_2$. Thus, whereas minor amounts of various compatible metal oxides such as the alkali metal oxides, the alkaline earth metal oxides, PbO, ZnO, $ZrO_2$, and $TiO_2$ can be tolerated, their absence is preferred and the total of such additions should be held to less than 2 mole percent to obtain the optimum electrical resistivity and coefficient of thermal expansion in the glaze and the minimal interference with the electronic properties of the silicon body.

Example 1 is our preferred composition since the glazes developed therefrom exhibit excellent homogeneity and bonding.

We claim:

1. A silicon body having a protective insulating surface layer, said layer comprising a glaze exhibiting a coefficient of thermal expansion between about 25–$50\times10^{-7}$/° C. (25°–700° C.) and consisting essentially, on the oxide basis, of about 45–60 mole percent $SiO_2$ and 40–55 mole percent $GeO_2$ the total of $SiO_2$ and $GeO_2$ constituting at least 98 mole percent of the composition.

2. A method according to claim 1 wherein said firing time ranges about 15–60 minutes.

3. A method according to claim 2 wherein said dried body is heated to about 750°–1000° C. in a flow of an inert gas for about 15 minutes.

4. A method according to claim 2 wherein said body is heated to about 1300°–1400° C. in a flow of an inert gas for about 15–60 minutes.

5. A method for making a protective insulating surface layer on a silicon body, said layer consisting of a glaze exhibiting a coefficient of thermal expansion between about 35–$50\times10^{-7}$/° C. (25°–700° C.) which comprises:

(a) melting a batch for a glass composition consisting essentially, on the oxide basis, of about 45–60 mole percent $SiO_2$ and 40–55 mole percent $GeO_2$, the total of $SiO_2$ and $GeO_2$ constituting at least 98 mole percent of the composition;
(b) cooling the melt to a glass and making a frit therefrom;
(c) applying said frit to a silicon body; and
(d) firing said silicon body at about 1300°–1400° C. for a sufficient length of time to soften said frit and cause it to spread over said silicon body.

6. A method for making a protective insulating surface layer on a silicon body, said layer consisting of a glaze exhibiting a coefficient of thermal expansion about 25–$50\times10^{-7}$/° C. (25°–700° C.) which comprises:

(a) melting a batch for a glass composition consisting essentially, on the oxide basis, of about 45–60 mole percent $SiO_2$ and 40–55 mole percent $GeO_2$, the total of $SiO_2$ and $GeO_2$ constituting at least 98 mole percent of the composition;
(b) cooling the melt to a glass and making a frit therefrom;
(c) mixing said frit with a readily-volatile carrier to form a slurry;
(d) coating a silicon body with said slurry;
(e) drying said slurry-coated silicon body at slightly elevated temperatures;
(f) heating said dried body to about 750°–1000° C. for a sufficient time to allow the removal of oxygen gas; and finally
(g) heating said body to about 1300°–1400° C. for a sufficient length of time to soften said frit and cause it to spread over said silicon body.

7. A method for making a protective insulating surface layer on a silicon body, said layer consisting of a glaze exhibiting a coefficient of thermal expansion between about $25\text{–}50 \times 10^{-7}/°$ C. (25°–700° C.), which comprises:

(a) evaporating a coating consisting essentially of silicon and germanium in the atomic ratio of about 45–60 silicon to 40–55 germanium onto a silicon body; and then (b) heating said coated body in an oxygen-containing atmosphere to oxidize the metal coating to $SiO_2$ and $GeO_2$.

8. A method according to claim 7 wherein said coated body is heated to about 750°–900° C.

References Cited

UNITED STATES PATENTS 3,255,120 6/1966 Cohen ............... 106—52

FOREIGN PATENTS 395,349 1965 Switzerland ......... 117—201

WILLIAM L. JARVIS, Primary Examiner

U.S. Cl. X.R.

23—110 R; 106—48, 52; 117—125